United States Patent

Gettert et al.

[11] 4,120,667
[45] Oct. 17, 1978

[54] ISOLATION OF PURE AMMONIA FROM GAS MIXTURES CONTAINING AMMONIA AND CARBON DIOXIDE

[75] Inventors: Hans Gettert, Mannheim; Hermann Dieter Fromm, Gruenstadt; Martin Molzahn, Ludwigshafen; Ernst-Juergen Schier, Bad Durkheim; Hans Henning Schneehage, Mutterstadt, all of Fed. Rep. of Germany

[73] Assignee: BASF Aktiengesellschaft, Ludwigshafen, Fed. Rep. of Germany

[21] Appl. No.: 841,552

[22] Filed: Oct. 12, 1977

[30] Foreign Application Priority Data

Oct. 16, 1976 [DE] Fed. Rep. of Germany ....... 2646804

[51] Int. Cl.² .............................................. B01D 53/14
[52] U.S. Cl. ........................................... 55/48; 55/56; 55/68; 55/70; 55/89; 55/93
[58] Field of Search ................... 55/46, 48, 56, 68, 70, 55/89, 93

[56] References Cited

U.S. PATENT DOCUMENTS

| | | | |
|---|---|---|---|
| 2,808,125 | 10/1957 | Buck et al. .............................. | 55/48 |
| 2,812,829 | 11/1957 | Marullo et al. ........................ | 55/70 X |
| 3,038,285 | 6/1962 | Mavrovic ................................ | 55/48 |
| 3,315,442 | 4/1967 | Yuan et al. .............................. | 55/70 |
| 3,691,729 | 9/1972 | De Rooy et al. ...................... | 55/93 X |
| 4,013,431 | 3/1977 | Berkel et al. .......................... | 55/68 X |

*Primary Examiner*—Thomas G. Wyse
*Assistant Examiner*—Richard W. Burks
*Attorney, Agent, or Firm*—Keil, Thompson & Shurtleff

[57] ABSTRACT

To isolate ammonia from gas mixtures containing ammonia and carbon dioxide, the gas mixture is first partially absorbed in a solvent, with residence times of at most 0.1 second, and the non-absorbed gas is then separated from the solution obtained. The solution is then subjected to a first desorption stage, in which only the ammonia present in an excess over a molar ratio of 3 parts of ammonia to 1 part of carbon dioxide is expelled by heating, and the entrained carbon dioxide is washed out of the expelled ammonia by means of solutions containing free ammonia. The solution remaining after the first desorption stage is substantially freed from ammonia and carbon dioxide in a second desorption stage and the expelled gas, containing solvent, together with fresh gas mixture is fed to the adsorption stage, while the solvent obtained from the second desorption stage is employed for the absorption.

10 Claims, 1 Drawing Figure

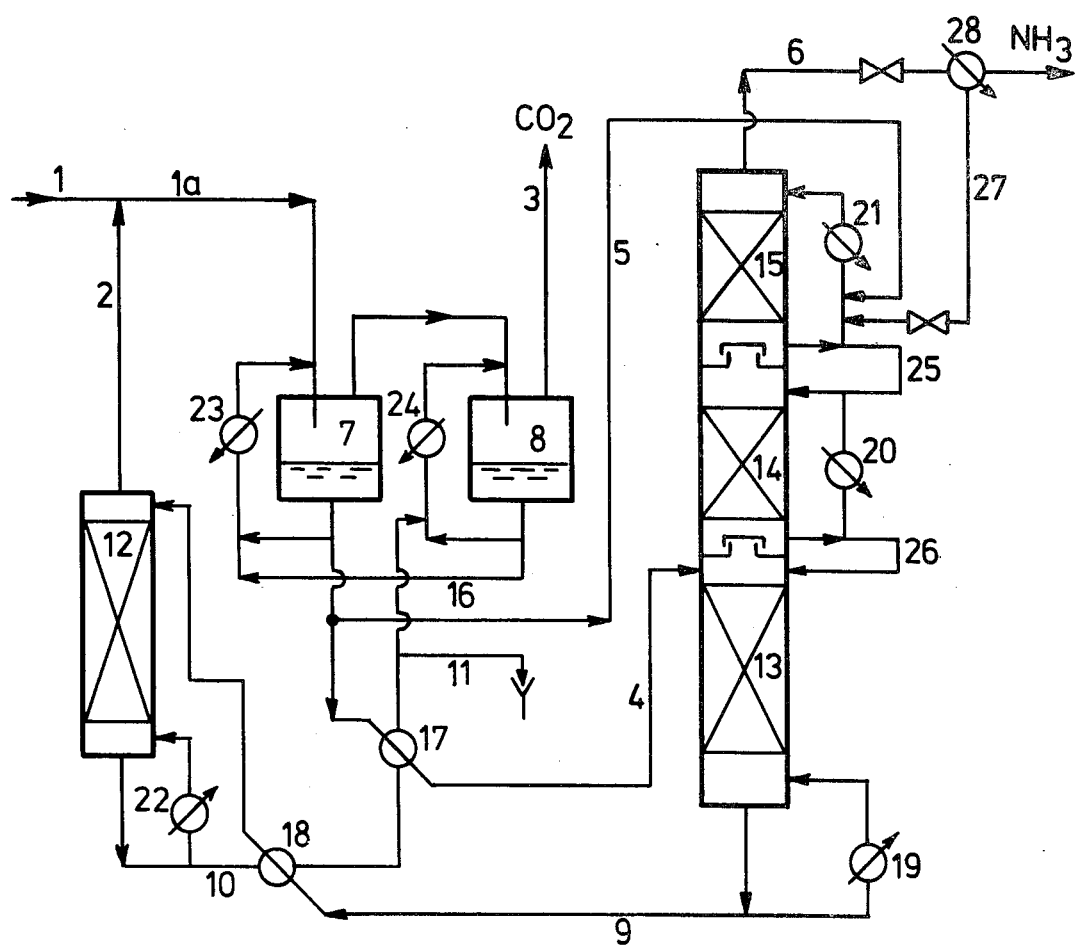

ISOLATION OF PURE AMMONIA FROM GAS MIXTURES CONTAINING AMMONIA AND CARBON DIOXIDE

In the synthesis of urea from ammonia and carbon dioxide, and the synthesis of melamine from urea, gas mixtures containing ammonia and carbon dioxide are formed, which must be re-used in order to utilize the ammonia, which is the constituent determining the value of the mixtures. This use may comprise, for example, recycling the ammonia/carbon dioxide mixture to the synthesis of urea. For this purpose, the gas mixture is absorbed in water and the carbamate solution thus obtained is fed into the urea reactor. The disadvantage of this method is that the water additionally introduced reduces the degree of conversion in the urea reactor.

Another possible way of using the gas containing ammonia and carbon dioxide is to react the ammonia with acids or acid solutions, to obtain ammonium salts. Such a method is relatively easy to carry out, but inescapably couples the formation of the salt to the process in which the gas mixture is formed.

In order to avoid such coupling, it is desirable to isolate the ammonia from the gas mixture and to recover it in a pure, preferably liquid form, so that it can, in the conventional manner, be stored and re-used for whatever purpose may be desired.

German Published Application DAS No. 1,592,349 describes a process which aims at a complete separation. This process is carried out by first absorbing carbon dioxide from the gas mixture by means of an ammonia-rich ammonium carbonate solution, then substantially freeing the resulting solution from dissolved ammonia under atmospheric pressure in the conventional manner by fractional desorption at an elevated temperature, and collecting the ammonia gas, and subsequently isolating pure carbon dioxide in the conventional manner, in another column, from the residual constant-boiling ammonium carbonate solution by distilling under superatmospheric pressure and adding a small amount of water at the top of the pressure column, the carbon dioxide being collected and the residue, consisting of an ammonia-rich ammonium carbonate solution, being recycled to the carbon dioxide absorption.

The disadvantage of this process is that substantial amounts of energy, at relatively high temperatures, are required to separate the gas into its constituents, since the isolation of the carbon dioxide under pressure must be carried out at from 120° to 170° C.

To overcome these disadvantages, German Laid-Open Application DOS No. 2,317,603 describes a process wherein a gas mixture containing ammonia and carbon dioxide is intimately mixed with a solvent in an absorption zone, using residence times of at most 0.1 second, and the non-absorbed gas mixture and the solvent are then separated from one another. This gives a solution in which ammonia is enriched relative to carbon dioxide. These solutions are worked up by initially again desorbing the entire ammonia and carbon dioxide taken up by the solvent during the absorption, and cooling the resulting gas mixture of carbon dioxide, ammonia and solvent vapor. Condensation of the solvent vapor gives a concentrated solution of ammonium carbamate which contains the entire carbon dioxide present in the desorbed gas. The non-condensed gas is substantially pure ammonia.

Working up the solutions as described has the disadvantage that the ammonia obtained still contains certain residual amounts of carbon dioxide which may, for example, lead, on compression of the ammonia, to an undesirable deposition of carbamate in the intercoolers, and which must therefore be removed. Furthermore, carbamate will also be deposited during the subsequent liquefaction of the ammonia, and will settle in the ammonia tank and may interfere with pumping. Further disadvantages of the above method of working up are that concentrated carbamate solutions readily deposit solid carbamate on cooling, which can lead to blockage of the heat exchangers and pipelines, and that the energy requirement is relatively high since first ammonia and carbon dioxide have to be completely desorbed and the portion which is recondensed on isolating the ammonium carbamate solution must again be completely vaporized on recycling to the absorption stage.

It is an object of the present invention to provide a process for isolating ammonia from gas mixtures containing ammonia and carbon dioxide by partially absorbing the gas mixture in a solvent, with intimate mixing and using residence times of at most 0.1 second, then separating the non-absorbed gas mixture and the solution obtained, and desorbing the solution containing excess ammonia, which process avoids the above disadvantages during desorption.

We have found that this object is achieved if, in a first desorption stage, only the ammonia present in an excess over a molar ratio of 3 parts of ammonia to 1 part of carbon dioxide is expelled by heating and the entrained carbon dioxide is washed out of the expelled ammonia with solutions which contain free ammonia, the residual solution (from the first desorption stage) is substantially freed from ammonia and carbon dioxide in a second desorption stage, the expelled solvent-containing gas together with fresh gas mixture is recycled to the absorption and the solvent obtained from the second desorption stage is employed as solvent in the absorption.

Gases which may be subjected to the treatment according to the invention include, in principle, all gases which contain carbon dioxide and ammonia, with or without other constituents such as nitrogen, hydrogen or other inert gases. The advantages of the process according to the invention come fully into play if the gas mixtures contain at least 5 per cent by volume of carbon dioxide and at least 10 per cent by volume of ammonia. Accordingly, the process is suitable for working up such gases as arise, for example, in the synthesis of urea and especially in the synthesis of melamine from urea, which latter gases contain from about 5 to 40 per cent by volume of carbon dioxide and from about 95 to 60 per cent by volume of ammonia.

Suitable solvents are, in principle, all solvents which have a good solvent power for ammonia, in particular water or aqueous solutions which may already contain dissolved ammonia and carbon dioxide in the form of ammonium carbamate or carbonate, but also organic solvents, in particular polyhydric alcohols, e.g. ethylene glycol and glycerol.

The temperature at which the absorption takes place should advantageously be as low as possible. Surprisingly, it has been found that the lower the temperature, the less carbon dioxide is dissolved. A lower limit is imposed on the temperature by the fact that, on the one hand, solids must not crystallize out and, on the other hand, that the process should still be economically feasible. Advantageously, the temperature of the solvent on leaving the mixing zone is not below −5° C, and an upper temperature limit of 50° C should not be exceeded. Preferably, the process is carried out at from 10° to 40° C. The above temperatures each relate to the temperature of the solvent on leaving the absorption zone.

In order to achieve maximum separation, the amount of solvent circulated through the mixing zone should be kept to the minimum range defined by the above discharge temperatures, since otherwise increased absorption of carbon dioxide takes place.

If the absorption of the gases is carried out with a residence time restricted to at most 0.1 second, the dissolution of ammonia relative to that of carbon dioxide is increased, so that the non-absorbed gas is enriched in carbon dioxide, compared to the feed gas, whilst the solvent becomes enriched with ammonia.

If such an absorption process is followed by a second and possibly even a third absorption process, virtually complete absorption of the ammonia can be achieved and a substantial proportion of the carbon dioxide can be separated off in a substantially ammonia-free form. Advantageously, the gas mixture and the solvent travel in counter-current if several absorption zones are used.

The solution which leaves the absorption zone and which is at a temperature of at most 50° C, and preferably at from 10° to 40° C, should contain ammonia and carbon dioxide in a molar ratio of at least 4:1, the ammonia content being from about 5 to 12% by weight and the carbon dioxide content from 2 to 6% by weight.

The solutions now pass into a first desorption stage, where the ammonia is desorbed at from 75° to 90° C, but only to the extent that the molar ratio of ammonia to carbon dioxide does not fall below 3.0 and preferably not below 3.3. As regards the upper limit, the molar ratio should not be more than 3.8 and preferably not more than 3.6.

The desorbed ammonia is then washed with aqueous solutions, containing free ammonia, in one or more steps, in order to remove any entrained carbon dioxide. The wash solution may be either aqueous ammonia produced, for example, by dissolving part of the product ammonia in water, or pure water which becomes saturated with ammonia during washing. However, the latter has the disadvantage that the heat of solution must be removed. If such wash solutions are used for washing out the carbon dioxide, the additionally introduced water must again be removed from the process, which if substantial amounts of water have been introduced, is a disadvantage because of the increased energy consumption which is entailed. Advantageously, the wash liquid used is a part-stream of the solution to be desorbed, which contains excess free ammonia. Surprisingly, no decrease in the ammonia yield is found with this method, i.e. the yield of ammonia, based on the total amount of the two part-streams of solution to be desorbed, is the same, for the same energy consumption, as that achieved when the total amount of the solution to be desorbed is fed only into the stripping column. Compared to the method in which the entire solution to be desorbed is fed to the stripping column and water or aqueous ammonia is added at the top of the column in order to wash out the carbon dioxide, the method according to the invention is energetically more advantageous, because no additional solvent enters the system, hence less energy is required and smaller columns suffice, and, unlike the case of using aqueous ammonia (prepared from the product $NH_3$) no additional heat of solution must be removed. As a result, the desorption can be carried out in a simpler and more advantageous manner. Since, with this method, the ratio of the part-streams of the solution to be desorbed, fed respectively to the top of the wash column and to the desorption column, can, surprisingly, be varied within a substantial range without a substantial change in the yield or in the amount of energy required, the carbon dioxide concentration in the uppermost wash stage can be kept sufficiently low, simply by correct choice of the said ratio, that, in terms of the vapor pressure, the ammonia gas in equilibrium contains no measureable proportion of carbon dioxide. The amount of solution fed to the top of the wash column is as a rule from 10 to 30% of the amount of solution to be desorbed. The temperatures in the wash column are from 35° to 50° C, preferably from 40° to 45° C.

Of course it is also possible to wash out the carbon dioxide from the ammonia in several, for example two, stages. For example, in a two-stage treatment, it is possible, in the wash stage immediately following the desorption, to maintain higher temperature, from 50° to 80° C, preferably from 55° to 65° C, depending on the concentration of the solution to be desorbed, the carbon dioxide concentration in the wash solution being from 4 to 20% by weight. In every case, however, a temperature of from 35° to 50° C, preferably from 40° to 45° C, must be maintained in the last stage.

In the case of a two-stage or multi-stage carbon dioxide wash it is energetically particularly advantageous, for a given separating capacity of the column, to carry out the wash stage immediately following the desorption adiabatically.

In every case, the circulation of wash liquid in the last washing stage should be such that the carbon dioxide content does not exceed 12% by weight, preferably 6% by weight, at the above temperatures of from 35° to 50° C, whilst the ammonia content corresponds to saturation.

After passing through the individual washing stages, the wash solution is fed to the first desorption stage.

The desorbed solution leaving the first desorption stage still contains all the carbon dioxide and a corresponding amount of ammonia, in the range of from 2.3 to 8.8% by weight. For this reason, the ammonia content and carbon dioxide content must be reduced further in a second desorption stage. The solution can be substantially desorbed, but contents of up to 4% by weight of $NH_3$ and up to 3% by weight of $CO_2$ in the desorbed solution which is recycled to the absorption stage do not have an adverse effect on the absorption. The second desorption stage is carried out at a higher temperature than the first desorption stage, in particular at from 87° to 98° C. The desorbed gas, which consists of ammonia, carbon dioxide and solvent vapors, is combined with fresh gas and recycled to the process.

The process according to the invention will be explained in more detail with reference to the accompanying diagrammatic drawing showing an installation comprising two-stage absorption and two-stage washing of the desorbed ammonia.

The gas mixture 1 which is to be separated, for example the off-gas from a melamine installation, is mixed with the ammonia/carbon dioxide/water vapor mixture 2, obtained by desorption of a dilute carbamate solution recycled to the process, and the mixture is fed through line 1a into a first absorption stage 7. The gas which is not absorbed passes into a second, similar absorption stage 8. From there, an off-gas consisting of substantially ammonia-free carbon dioxide is obtained.

The absorbent introduced into the second absorption stage, through line 10, is an aqueous solution from the bottom of the second desorption column 12. A corresponding amount of absorption solution passes from this absorption stage through line 16 into the first absorption stage 7. The solution, containing predominantly ammonia, obtained in this stage passes into the desorption part of the installation.

A part of the solution to be desorbed is fed through line 5 to the top of the uppermost $CO_2$ wash stage 15. The other part is heated in a heat exchanger 17 by means of the solution 10 returning to the second absorption stage from the second desorption column 12 and is fed through line 4 to the desorption column 13. The contents of the column are heated by the circulatory vaporizer 19 to the required temperature, which is from 75° to 90° C depending on the concentration of the solution to be desorbed. The desorbed gases, which consist predominantly of ammonia, with some $CO_2$ and water vapor, pass through an intermediate tray into the lower $CO_2$ wash stage 14 and from there into the upper $CO_2$ wash stage 15, at the top of which pure ammonia 6, free from carbon dioxide but still containing water vapor is obtained; this may be dried, and liquefied by compression, in the conventional manner. In that case, the water content is advantageously condensed in a condenser 28 and fed through line 27 into the column. The $CO_2$ concentration of the ammonia-saturated solution circulating in wash stage 15 is adjusted, by varying the amount of the part-stream 5 of the solution to be desorbed, so that the ammonia gas in vapor pressure equilibrium with the solution no longer contains a measurable proportion of carbon dioxide. The reflux runs through line 25 into the lower $CO_2$ wash stage 14 and from there through line 26 into the desorption column 13. The solution in the lower $CO_2$ wash stage 14 is saturated with ammonia at the corresponding temperature and contains from about 4 to 20% by weight of carbon dioxide depending on the concentration of the solution to be desorbed, and on the energy supplied to the bottom of the column. The solutions in the wash circulation systems, in each of which intensive material exchange and heat exchange take place, are pumped through the coolers 20 and 21 and cooled thereby. The reflux 26 in column 14 runs into the desorption column 13.

If the wash stage immediately following the desorption stage is operated adiabatically, the cooler 20 is omitted. This method of operation is energetically particularly advantageous since the heat which would otherwise be removed in the cooler 20 would have to be resupplied by the circulatory vaporizer 19.

The material from the bottom of the first desorption column, which contains the entire carbon dioxide introduced into the desorption process, passes through the line 9 into a heat exchanger 18, where it is preheated by the solution 10 leaving the bottom of the second desorption column 12, and is fed to the top of the second desorption column 12. In column 12, desorption of the solution is effected by the circulatory vaporizer 22 at from 87° to 98° C. The material from the bottom of the column 12 passes through line 10 into the second absorption stage 8. The gas consisting of ammonia, carbon dioxide and water vapor is returned to the process through line 2, together with the fresh gas 1.

Since the $NH_3/CO_2$ gas mixtures to be separated in practice mostly also contain water vapor, and hence more water enters the process than is discharged with the gases leaving the process, excess water can be removed, in the form of the solution from the bottom of the second desorption column 12, through line 11.

In the Examples, amounts relate to the throughput per hour. All percentages are by weight.

EXAMPLE 1

A gas mixture consisting in the main of ammonia and carbon dioxide is introduced into an installation like that shown schematically in the FIGURE. The gas is composed of 3,177 kg of ammonia, 3,776 kg of carbon dioxide and 297 kg of water vapor. Before entering the first absorption stage, this gas is mixed with a gas, from the desorption column 12, which consists of 1,551 kg of ammonia, 1,496 kg of carbon dioxide and 1,343 kg of water vapor. In the first absorption stage 7, the mixture thus obtained is brought into contact with a solution which is taken off the second absorption stage 8 through line 16. The duration of mixing is about 2/100 second. The solution is circulated through the cooler 23 at an hourly rate of 200 m³. The off-gas from the first absorption stage 7 passes to the second absorption stage 8 to undergo further separation. In this second absorption stage, the absorption solution is circulated through the cooler 24 at an hourly rate of about 200 m³. Here again, the duration of mixing is set to about 2/100 second. The off-gas from this stage (line 3) consists of 3,772 kg of carbon dioxide, 106 kg of ammonia and 75 kg of water vapor.

The solution leaving the second absorption stage enters the first absorption stage, as already stated. The aqueous solution obtained there, which contains 10.1% by weight of ammonia and 4.1% by weight of carbon dioxide, corresponding to a molar ratio of $NH_3:CO_2 = 6.4:1$, is divided into two parts. One part, which contains 1,365 kg of ammonia, 554 kg of carbon dioxide and 11,596 kg of water is fed through line 5 to the top of the uppermost $CO_2$ wash stage 15 of the first desorption column. The other part, which consists of 5,122 kg of ammonia, 2,077 kg of carbon dioxide and 43,493 kg of water is heated to 70° C in a heat exchanger 17 by means of the solution 10 returning from the second desorption column 12 to the second absorption stage, and is fed into the desorption column 13 through line 4. The contents of the column are heated to the temperature of about 83° C, required for the desorption, by means of the circulatory vaporizer 19. The solution from the bottom of the column, which comprises 3,423 kg of ammonia (5.6%), 2,631 kg of carbon dioxide (4.3%) (molar ratio of $NH_3:CO_2 = 3.37:1$) and 55,076 kg of water and contains the entire amount of the carbon dioxide introduced with the solution passes through line 9 into a heat exchanger 18 where it is preheated to 93° C by the solution 10 leaving the bottom of the second desorption column 12, and is fed to the top of the second desorption column 12.

The desorption of the solution in the column 12 is effected by the circulatory vaporizer 22 at about 98° C and under slightly superatmospheric pressure (1.5 bars absolute), the pressure being determined by the pressure losses of the various stages of the installation. The material at the bottom of the column 12, which still contains 3.3% of ammonia and 2.0% of carbon dioxide, passes through line 10 and via the heat exchangers 18 and 19 into the second absorption stage 8. The gas consisting of ammonia, carbon dioxide and water vapor is recycled, as already described, through line 2 to the process, together with fresh gas 1.

The desorption in the first desorption column takes place in the stripping section 13 of the column, under atmospheric pressure, with a bottom temperature of about 83° C. The desorbed gases, which consist predominantly of ammonia, with some carbon dioxide and water vapor, pass via an intermediate tray into the lower $CO_2$ wash stage 14 where they are brought into intimate contact with the wash solution which is circulated through the cooler 20 at an hourly rate of 120 m³, and returned into the column after having been combined with the reflux 25 from the upper wash stage. The cooler is operated so that the solution leaving this part of the column is at about 59° C. The solution contains about 16% by weight of $NH_3$ and about 11% by weight of $CO_2$. The reflux returns through line 26 into the stripping column 13. The gas leaving the lower $CO_2$ wash stage is fed, via a further intermediate tray, to the upper $CO_2$ wash stage 15 where it is brought into intimate contact with the wash solution circulated through the cooler 21, again at an hourly rate of 120 m³. The cooler 21 is operated in such a way that the ammonia gas at the top of the column is at about 42° C. The reflux formed consists mainly of the solution to be desorbed which is fed in at the top of the $CO_2$ wash stage 15, and additionally contains small amounts of condensed water with dissolved $NH_3$ and $CO_2$. This reflux is led through line 25 into the solvent circulation of the lower $CO_2$ wash stage 14. The solution leaving part 15 of the column is saturated with ammonia, and contains about 22% of $NH_3$ and about 5% of $CO_2$. At the top of the column, a gas which consists of 3,366 kg of ammonia and 249 kg of water vapor and is free from carbon dioxide is taken off through line 6.

The water which leaves through line 6 at the top of the column is partially returned to column 15 through line 27, with the aid of the cooler 28, for example an intercooler of an ammonia compression unit. Solution 27 is at 6 bars and 40° C and consists of 234 kg of water and 302 kg of ammonia dissolved therein. Accordingly, the $NH_3$ gas leaving the cooler 28 only retains 0.5% of water vapor and consists of 3,064 kg of ammonia and 15 kg of water.

EXAMPLE 2

An installation as shown schematically in the FIGURE is operated as described in Example 1, but with the following modifications:

The desorption in the first desorption column 13 is carried out at a bottom temperature of about 82° C. The lower $CO_2$ wash stage 14 is operated adiabatically, so that the cooler 20 is omitted. The solution which leaves this part of the column, and which returns, as reflux, to the desorption column 13 through line 26, contains about 16% of $NH_3$ and about 9% of $CO_2$ at about 60° C. The gas which leaves the lower $CO_2$ wash stage passes into the upper $CO_2$ wash stage 15, as described in Example 1. The cooler 21 is also operated as described in Example 1. The solution leaving part 15 of the column however contains about 22% of $NH_3$ and about 4% of $CO_2$. The bottom solution which passes from the first desorption column 13 through line 9 into the second desorption column 12 contains 5.9% of $NH_3$ and 4.3% of $CO_2$ (molar ratio $NH_3$:$CO_2$ = 3.55:1).

In the second desorption column 12, the desorption takes place as described in Example 1 and leads to a bottom concentration of 3.3% of $NH_3$ and 2.0% of $CO_2$.

With this method, an energy saving of 10% is achieved relative to Example 1.

We claim:

1. A process for isolating ammonia from gas mixtures containing ammonia and carbon dioxide by partially absorbing the gas mixture in a solvent, with intimate mixing and using residence times of at most 0.1 second, then separating the non-absorbed gas mixture and the solution obtained, and desorbing the solution containing excess ammonia, wherein, in a first desorption stage, only the ammonia present in an excess over a molar ratio of 3 parts of ammonia to 1 part of carbon dioxide is expelled by heating and the entrained carbon dioxide is washed out of the expelled ammonia with solutions which contain free ammonia, the residual solution from the first desorption stage is substantially freed from ammonia and carbon dioxide in a second desorption stage, the expelled solvent-containing gas together with fresh gas mixture is recycled to the absorption and the solvent obtained from the second desorption stage is employed as solvent in the absorption.

2. A process as claimed in claim 1, in which only a part-stream of the solution to be desorbed is introduced directly into the desorption zone and the remaining part-stream is employed to wash out the carbon dioxide expelled with the ammonia in the first desorption stage, before passing said part-stream to the desorption zone.

3. A process as claimed in claim 1, in which the first desorption stage is operated at from 75° to 90° C.

4. A process as claimed in claim 1, in which the second desorption stage is operated at from 87° to 98° C.

5. A process as claimed in claim 1, in which the solution leaving the second desorption stage still has a residual content of up to 4% by weight of ammonia.

6. A process as claimed in claim 1, in which the carbon dioxide is washed out in one stage, at from 35° to 50° C.

7. A process as claimed in claim 1, in which the carbon dioxide is washed out of the ammonia, expelled in the first desorption stage, in at least two stages.

8. A process as claimed in claim 7, in which the wash stage immediately following the desorption is carried out at from 50° to 80° C and the last wash stage is carried out at from 35° to 50° C.

9. A process as claimed in claim 8, in which the wash stage immediately following the desorption is operated adiabatically.

10. A process as claimed in claim 1, in which the amount of the solution, containing free ammonia, used to wash out the carbon dioxide is so chosen that after washing out the carbon dioxide the said solution does not contain more than 12% by weight of carbon dioxide at from 35° to 50° C, when saturated with ammonia.

* * * * *